United States Patent
Rothwell et al.

(10) Patent No.: US 9,734,138 B2
(45) Date of Patent: Aug. 15, 2017

(54) SYSTEM AND METHOD OF ANNOTATING UTTERANCES BASED ON TAGS ASSIGNED BY UNMANAGED CROWDS

(71) Applicant: VoiceBox Technologies Corporation, Bellevue, WA (US)

(72) Inventors: Spencer John Rothwell, Seattle, WA (US); Daniela Braga, Bellevue, WA (US); Ahmad Khamis Elshenawy, Lynnwood, WA (US); Stephen Steele Carter, Seattle, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 0 days.

(21) Appl. No.: 15/257,084

(22) Filed: Sep. 6, 2016

(65) Prior Publication Data
US 2017/0068651 A1    Mar. 9, 2017

Related U.S. Application Data

(60) Provisional application No. 62/215,116, filed on Sep. 7, 2015.

(51) Int. Cl.
  *G06F 17/24* (2006.01)
  *G06F 17/21* (2006.01)
  *G06F 17/27* (2006.01)

(52) U.S. Cl.
  CPC ......... *G06F 17/241* (2013.01); *G06F 17/218* (2013.01); *G06F 17/278* (2013.01); *G06F 17/2785* (2013.01)

(58) Field of Classification Search
  CPC ............ G10L 15/06; G10L 2015/0633; G10L 2015/0638; G06Q 10/06311;
  (Continued)

(56) References Cited

U.S. PATENT DOCUMENTS 7,197,459 B1    3/2007  Harinarayan et al.
7,912,726 B2    3/2011  Alshawi
(Continued)

FOREIGN PATENT DOCUMENTS

WO    2017044368    3/2017
WO    2017044369    3/2017
(Continued)

OTHER PUBLICATIONS

Amazon, "Amazon Mechanical Turk API Reference", API Version Mar. 25, 2012, available at: http://awsdocs.s3.amazonaws.com/MechTurk/20120325/amt-API-20120325.pdf, 234 pages.
(Continued)

*Primary Examiner* — Martin Lerner
(74) *Attorney, Agent, or Firm* — Sheppard Mullin Richter & Hampton LLP

(57) ABSTRACT

A system and method of tagging utterances with Named Entity Recognition ("NER") labels using unmanaged crowds is provided. The system may generate various annotation jobs in which a user, among a crowd, is asked to tag which parts of an utterance, if any, relate to various entities associated with a domain. For a given domain that is associated with a number of entities that exceeds a threshold N value, multiple batches of jobs (each batch having jobs that have a limited number of entities for tagging) may be used to tag a given utterance from that domain. This reduces the cognitive load imposed on a user, and prevents the user from having to tag more than N entities. As such, a domain with a large number of entities may be tagged efficiently by crowd participants without overloading each crowd participant with too many entities to tag.

20 Claims, 5 Drawing Sheets

(58) Field of Classification Search
CPC . G06Q 10/06312; G06F 21/36; G06F 17/218;
G06F 17/241; G06F 17/278; G06F
17/2785
USPC ....... 704/9, 243, 270, 270.1; 705/7.13, 7.15,
705/7.16, 66, 67; 726/7
See application file for complete search history.

(56) References Cited

U.S. PATENT DOCUMENTS

| | | | |
|---|---|---|---|
| 7,966,180 | B2 | 6/2011 | Bajaj et al. |
| 8,731,925 | B2 | 5/2014 | Da Palma |
| 8,805,110 | B2 | 8/2014 | Rhoads et al. |
| 8,847,514 | B1 | 9/2014 | Reynoso et al. |
| 8,849,259 | B2 | 9/2014 | Rhoads et al. |
| 8,855,712 | B2 | 10/2014 | Lord et al. |
| 8,886,206 | B2 | 11/2014 | Lord et al. |
| 8,925,057 | B1 | 12/2014 | Ansari et al. |
| 8,929,877 | B2 | 1/2015 | Rhoads et al. |
| 9,008,724 | B2 | 4/2015 | Lord |
| 9,043,196 | B1 | 5/2015 | Leydon |
| 9,047,614 | B2 | 6/2015 | Kalikivayi et al. |
| 9,190,055 | B1* | 11/2015 | Kiss ................. G10L 15/07 |
| 9,361,887 | B1 | 6/2016 | Braga et al. |
| 9,401,142 | B1 | 7/2016 | Rothwell et al. |
| 9,436,738 | B2* | 9/2016 | Ehsani ............. G06F 17/30545 |
| 9,448,993 | B1 | 9/2016 | Braga et al. |
| 9,452,355 | B1* | 9/2016 | Lin ................... A63F 13/12 |
| 9,519,766 | B1 | 12/2016 | Bhosale |
| 2002/0065848 | A1 | 5/2002 | Walker |
| 2003/0126114 | A1 | 7/2003 | Tedesco |
| 2004/0093220 | A1 | 5/2004 | Kirby et al. |
| 2004/0138869 | A1 | 7/2004 | Heinecke |
| 2005/0108001 | A1 | 5/2005 | Aarskog |
| 2007/0044017 | A1 | 2/2007 | Zhu |
| 2007/0050191 | A1 | 3/2007 | Weider |
| 2007/0100861 | A1 | 5/2007 | Novy |
| 2007/0192849 | A1* | 8/2007 | Golle ................ G06F 21/34 726/16 |
| 2007/0198952 | A1 | 8/2007 | Pittenger |
| 2007/0265971 | A1 | 11/2007 | Smalley |
| 2008/0046250 | A1 | 2/2008 | Agapi |
| 2009/0013244 | A1 | 1/2009 | Cudich |
| 2009/0150983 | A1 | 6/2009 | Saxena et al. |
| 2011/0054900 | A1 | 3/2011 | Phillips |
| 2011/0252339 | A1 | 10/2011 | Lemonik |
| 2012/0066773 | A1 | 3/2012 | Weisberger |
| 2012/0197770 | A1 | 8/2012 | Raheja |
| 2012/0232907 | A1* | 9/2012 | Ivey ................. G06F 21/30 704/273 |
| 2012/0254971 | A1 | 10/2012 | Hu et al. |
| 2012/0265528 | A1 | 10/2012 | Gruber et al. |
| 2012/0265578 | A1* | 10/2012 | Olding ............... G06Q 10/06 705/7.25 |
| 2012/0284090 | A1 | 11/2012 | Marins |
| 2013/0054228 | A1 | 2/2013 | Baldwin |
| 2013/0231917 | A1 | 9/2013 | Naik |
| 2013/0253910 | A1 | 9/2013 | Turner |
| 2013/0262114 | A1 | 10/2013 | Brockett et al. |
| 2013/0289994 | A1 | 10/2013 | Newman |
| 2013/0304454 | A1* | 11/2013 | Kimberly ............ G06F 17/218 704/9 |
| 2013/0325484 | A1 | 12/2013 | Chakladar |
| 2014/0067451 | A1 | 3/2014 | Balamurugan et al. |
| 2014/0156259 | A1 | 6/2014 | Dolan et al. |
| 2014/0167931 | A1 | 6/2014 | Lee |
| 2014/0193087 | A1* | 7/2014 | Conwell ........... G06F 17/30265 382/224 |
| 2014/0196133 | A1 | 7/2014 | Shuster |
| 2014/0244254 | A1 | 8/2014 | Ju et al. |
| 2014/0249821 | A1 | 9/2014 | Kennewick et al. |
| 2014/0279780 | A1 | 9/2014 | Dasgupta et al. |
| 2014/0304833 | A1* | 10/2014 | Gujar ................. G06F 21/31 726/28 |
| 2014/0358605 | A1* | 12/2014 | Balamurugan .. G06Q 10/06311 705/7.13 |
| 2015/0006178 | A1 | 1/2015 | Peng et al. |
| 2015/0095031 | A1 | 4/2015 | Conkie et al. |
| 2015/0120723 | A1 | 4/2015 | Deshmukh et al. |
| 2015/0128240 | A1 | 5/2015 | Richards |
| 2015/0154284 | A1* | 6/2015 | Pfeifer .............. G06F 17/30657 707/723 |
| 2015/0169538 | A1 | 6/2015 | Reynolds |
| 2015/0213393 | A1 | 7/2015 | O'Neill et al. |
| 2015/0269499 | A1 | 9/2015 | B |
| 2015/0278749 | A1 | 10/2015 | Bhagat et al. |
| 2015/0339940 | A1 | 11/2015 | Aggarwal et al. |
| 2015/0341401 | A1 | 11/2015 | Lee |
| 2016/0012020 | A1* | 1/2016 | George ............... G06F 17/2785 704/9 |
| 2016/0048486 | A1 | 2/2016 | Lopategui |
| 2016/0285702 | A1 | 9/2016 | Beausoleil |
| 2016/0329046 | A1 | 11/2016 | Gross |
| 2016/0342898 | A1* | 11/2016 | Ehsani ............. G06F 17/30545 |
| 2017/0017791 | A1 | 1/2017 | Huang |
| 2017/0039505 | A1* | 2/2017 | Prabhakara ....... G06F 17/30958 |
| 2017/0068656 | A1 | 3/2017 | Braga |
| 2017/0068659 | A1 | 3/2017 | Rothwell |
| 2017/0068809 | A1 | 3/2017 | Bhosale |
| 2017/0069039 | A1 | 3/2017 | Kennewick |
| 2017/0069325 | A1 | 3/2017 | Braga |
| 2017/0069326 | A1 | 3/2017 | Rothwell |

FOREIGN PATENT DOCUMENTS

| | | |
|---|---|---|
| WO | 2017044370 | 3/2017 |
| WO | 2017044371 | 3/2017 |
| WO | 2017044408 | 3/2017 |
| WO | 2017044409 | 3/2017 |
| WO | 2017044415 | 3/2017 |

OTHER PUBLICATIONS

Amazon, "Amazon Mechanical Turk Developer Guide", API Version Mar. 25, 2012, available at: http://awsdocs.s3.amazonaws.com/MechTurk/20120325/amt-dgi-20120325.pdf, 43 pages.
Amazon, "Amazon Mechanical Turk Getting Started Guide", API Version Mar. 25, 2012, available at http://awsdocs.s3.amazonaws.com/MechTurk/20120325/amt-gsg-20120325.pdf, 36 pages.
Amazon, "Amazon Mechanical Turk Requester UI Guide", API Version Mar. 25, 2012, available at hffp://awsdocs.s3.amazonaws.com/MechTurk/20120325/amtui-20120325.pdf, 59 pages.
Badenhorst, Jaco, et al., "Quality Measurements for Mobile Data Collection in the Developing World", SLTU, 2012, 7 pages.
Bontcheva, Kalina, et al. "Crowdsourcing Named Entity Recognition and Entity Linking Corpora", Handbook of Linguistic Annotation, Springer, 2014, 18 pages.
Braunschweig, Katrin, et al., "Enhancing Named Entity Extraction by Effectively Incorporating the Crowd", BTW Workshops, 2013, pp. 181-195.
Callison-Burch, Chris, et al., "Creating speech and language data with Amazon's Mechanical Turk", Proceedings of the NAACL HLT 2010 Workshop on Creating Speech and Language Data with Amazon's Mechanical Turk, Association for Computational Linguistics, 2010, 12 pages.
Carmel, David, et al., "ERD'14: Entity Recognition and Disambiguation Challenge", ACM SIGIR Forum, vol. 48, No. 2, 2014, pp. 63-77.
De Vries, Nic J., et al., "A Smartphone-Based ASR Data Collection Tool for Under-Resourced Languages", Speech Communication, vol. 56, 2014, pp. 119-131.
Derczynski, Leon, et al., "Analysis of Named Entity Recognition and Linking for Tweets", Information Processing & Management, vol. 51, No. 2, 2015, pp. 32-49.
Draxler, Christoph, "Interfaces for Crowdsourcing Platforms", from "Crowdsourcing for Speech Processing: Applications to Data Collection, Transcription, and Assessment", Chapter 9, pp. 241-278, John Wiley & Sons, 2013, 48 pages.

(56) References Cited

OTHER PUBLICATIONS

Eickhoff, C. et al., "Increasing Cheat Robustness of Crowdsourcing Tasks", Information Retrieval, vol. 16, No. 2, 2013, 18 pages.
Eickhoff, Carsten, "How Crowdsourcable is Your Task?", Proceedings of the Workshop on Crowdsourcing for Search and Data Mining, Feb. 9, 2011, pp. 11-14.
Finin, Tim, et al., "Annotating Named Entities in Twitter Data With Crowdsourcing", Proceedings of the NAACL HLT 2010 Workshop on Creating Speech and Language Data With Amazon's Mechanical Turk, Association for Computational Linguistics, Jun. 2010, pp. 80-88.
Freitas, Joao, et al., "Crowd-sourcing Platform for Large-Scale Speech Data Collection", Proc. FALA, 2010, 4 pages.
Gadiraju, Ujwal, et al., "Understanding Malicious Behavior in Crowdsourcing Platforms: The Case of Online Surveys", CHI 2015—Conference on Human Factors in Computing Systems, Seoul, South Korea, Apr. 18, 2015, 10 pages.
Gennaro, Rosario, et al., "Non-Interactive Verifiable Computing: Outsourcing Computation to Untrusted Workers", Advances in Cryptology-CRYPTO 2010, Springer Berlin Heidelberg, 2010, 19 pages.
Hsueh, Pei-Yun, et al., "Data Quality from Crowdsourcing: A Study of Annotation Selection Criteria", Proceedings of the NAACL HLT Workshop on Active Learning for Natural Language Processing, Boulder, Colorado, Jun. 2009, pp. 27-35.
Hughes, Thad, et al., "Building Transcribed Speech Corpora Quickly and Cheaply for Many Languages", INTERSPEECH, 2010, 4 pages.
Ipeirotis, Panagiotis G., "Quality Management on Amazon Mechanical Turk", Proceedings of the ACM SIGKDD Workshop on Human Computation, ACM, Jul. 2010, pp. 64-67.
Kaufmann, Nicolas, et al., "More Than Fun and Money. Worker Motivation in Crowdsourcing—A Study on Mechanical Turk", Proceedings of the Seventeenth Americas Conference on Information Systems, AMCIS, vol. 11, Aug. 4, 2011, pp. 1-11.
Lawson, Nolan, et al., "Annotation Large Email Datasets for Named Entity Recognition with Mechanical Turk", Proceedings of the NAACL HLT 2010 Workshop on Creating Speech and Language Data With Amazon's Mechanical Turk, Association for Computational Linguistics, Jun. 2010, pp. 71-79.
Levenshtein, V., I., Binary Codes Capable of Correcting Deletions, Insertions, and Reversals, Soviet Physics-Doklady, vol. 10, No. 8, Feb. 1966, pp. 707-710.
Liu, Sean, et al., "A Collective Data Generation Method for Speech Language Models", Spoken Language Technology Workshop (SLT), 2010 IEEE, IEEE, 2010, 6 pages.
McGraw, "Collecting Speech from Crowds", from "Crowdsourcing for Speech Processing: Applications to Data Collection, Transcription, and Assessment", Chapter 3, pp. 37-71, John Wiley & Sons, 2013, 44 pages.
McGraw, Ian Carmichael, "Crowd-Supervised Training of Spoken Language Systems", Dissertation, Massachusetts Institute of Technology, 2012, 166 pages.
McGraw, Ian, et al., "Collecting Voices from the Cloud", LREC, 2010, 8 pages.
McGraw, Ian, et al., "How to Control and Utilize Crowd-Collected Speech", from "Crowdsourcing for Speech Processing: Applications to Data Collection, Transcription, and Assessment", Chapter 5, pp. 106-136, John Wiley & Sons, 2013, 40 pages.
Oleson, David, et al., "Programmatic Gold: Targeted and Scalable Quality Assurance in Crowdsourcing", Human Computation, Papers from the 2011 AAAI Workshop (WS-11-11), vol. 11, 2011, 6 pages.
Rutherford, Attapol T., et al., "Pronunciation Learning for Named-Entities Through Crowd-Sourcing", Proceedings of the 15th Annual Conference on the International Speech Communication Association, 2015, 5 pages.
Sabou, M. et al., "Crowdsourcing Research Opportunities: Lessons from Natural Language Processing", iKnow 2012—Proceedings of the 12th International Conference on Knowledge Management and Knowledge Technologies, Graz, Austria, Article 17, Sep. 5, 2012, 8 pages.
Sabou, Marta, et al., "Corpus Annotation through Crowdsourcing: Towards Best Practice Guidelines", Proceedings of the 9th International Conference on Language Resources and Evaluation, Reykjavik, Iceland, 2014, 8 pages.
Soleymani, Mohammad, et al., "Crowdsourcing for Affective Annotation of Video: Development of a Viewer-Reported Boredom Corpus", Proceedings of the ACM SIGIR 2010 Workshop on Crowdsourcing for Search Evaluation, Jul. 19, 2010, pp. 4-8.
Suzic, Sinisa, et al., "On the Realization of AnSpeechCollector, System for Creating Transcribed Speech Database", 2014, 4 pages.
Voyer, Robert, et al., "A Hybrid Model for Annotating Named Entity Training Corpora", Proceedings of the Fourth Linguistic Annotation Workshop, Association for Computational Linguistics, Jul. 15, 2010, pp. 243-246.
Wang, Gang, et al., Serf and Turf: Crowdturfing for Fun and Profit, Proceedings of the WWW, New York, Apr. 16, 2012, pp. 679-688.
Buchholz, Sabine, et al., "Crowdsourcing Preference Tests, and How to Detect Cheating", in INTERSPEECH 2011, 4 pages.

\* cited by examiner

SYSTEM AND METHOD OF ANNOTATING UTTERANCES BASED ON TAGS ASSIGNED BY UNMANAGED CROWDS

CROSS-REFERENCE TO RELATED APPLICATIONS

This application claims priority to U.S. Provisional Patent Application No. 62/215,116, entitled "SYSTEM AND METHOD OF ANNOTATING UTTERANCES BASED ON TAGS ASSIGNED BY UNMANAGED CROWDS," filed on Sep. 7, 2015, which is incorporated by reference herein in its entirety. This application is related to co-pending PCT Application No. PCT/US16/50373, entitled "SYSTEM AND METHOD OF ANNOTATING UTTERANCES BASED ON TAGS ASSIGNED BY UNMANAGED CROWDS," filed concurrently herewith, which is incorporated by reference herein in its entirety.

FIELD OF THE INVENTION

The invention relates to a system and method for tagging utterances with Named Entity Recognition ("NER") labels using unmanaged crowds.

BACKGROUND OF THE INVENTION

Building Natural Language Understanding ("NLU") models requires a large amount of text utterances. In order to collect extensive quantities of annotations in a cost-effective manner and with fast turnaround, we leveraged crowdsourcing, specifically using unmanaged crowds. Crowds can generate creative input for open ended questions, which then can be used as bootstrapping data for NLU models. It is difficult, however, to prevent spam when collecting open text. Spam is intentionally produced and may be identified based on the regular pattern it shows (e.g. copy and paste of the same string along all the units of the task). Low quality responses from crowds are less obvious and not necessarily intentionally produced (e.g. an utterance about sports in response to a scenario regarding weather).

In most crowdsourcing tasks, gold test questions are interspersed throughout the task to measure worker accuracy and ensure data quality. This approach is not applicable when collecting open text responses because there is no single correct response.

In addition to the difficulties with open text collection, unmanaged crowds are difficult to train for complicated or specialized tasks. Workers have limited attention spans and often neglect to read the instructions for their tasks. Most crowdsourcing tasks therefore tend to be simple and intuitive. The task of labeling named entities is more difficult than typical crowdsourcing tasks because it requires an intimate understanding of many different entity labels across domains.

These and other problems exist for using crowds to annotate utterances with NER labels.

SUMMARY OF THE INVENTION

The invention addressing these and other drawbacks relates to a system and method for tagging utterances with NER labels using unmanaged crowds.

A system may generate various annotation jobs in which a user, among a crowd, is asked to tag which parts of an utterance, if any, relate to various entities associated with a domain. A domain may relate to a broad category of information. An entity may relate to a sub-category of information within the category of information. For example, in a "Movie" or "Control" domain, a user may be tasked to identify which parts of the utterance "watch Jurassic Park on channel 53", if any, relates to a "channel" entity and which parts of the utterance, if any, relates to a "program" entity. In the foregoing example, the system may receive from the user an annotation input indicating that "Jurassic Park" relates to the "Program" entity and "53" relates to the "Channel" entity. In instances that the user does not believe any portion of utterance relates to a given entity, the annotation input for that entity may be left blank or populated with a null indicator.

Multiple users among the crowd may be tasked to perform the same job, thereby collecting a large volume of annotations from different users. Additionally, different permutations of entities may be presented in different sets of jobs. Each permutation may be provided to several users. In this manner, a robust set of annotations of utterances may be collected using unmanaged crowds.

The system may employ various techniques to obtain high quality data by limiting the number of entities a user is asked to tag. For instance, the system may reduce cognitive loads on a user performing an annotation task by limiting the number of entities that the user is asked to analyze. Such limitation may be necessary for domains that are associated with a large number of entities. In this scenario, a user in a crowd may (and typically does) become overwhelmed at the number of entities that must be analyzed in a given job. To mitigate this, the system may limit the number of entities that are presented in a given job, even though a given domain has multiple entities that must be analyzed. To obtain proper data coverage, the system may create multiple jobs to be tasked to unmanaged crowds.

For instance, for a given domain that is associated with a number of entities that exceeds a threshold N value, multiple batches may be used to tag a given utterance from that domain. This reduces the cognitive load imposed on a user, and prevents the user from having to tag more than N entities. As such, a domain with a large number of entities may be tagged efficiently by crowd participants without overloading each crowd participant with too many entities to tag.

In particular, for a given utterance, the system may generate a number of jobs to be performed so that each job has a number of entities to be tagged less than (or equal to) the threshold number. As such, the system may employ multiple annotation batches (each having a different set of entities to be tagged) for a single utterance in a domain having a number of entities that exceeds the threshold number. Jobs from each of the multiple annotation batches may be tasked to multiple users in the crowd, with each user being provided with a job having the same or different set of entities for tagging the single utterance as another user. For example, if two batches of jobs are generated, one set of users may be tasked with tagging an utterance associated with a first batch having a first set of domains and a second set of users may be tasked with tagging an utterance associated with a second batch having a second set of domains different from the first set of domains.

On the other hand, if the number of entities does not exceed the threshold number, the system may, for a given utterance, generate a single annotation batch to be performed. The single annotation batch may be provided to multiple users in the crowd, with each user being asked to tag the same utterance based on the same set of entities as another user.

Other techniques described herein reduce instances of spam or otherwise poor quality responses, such as the use of an inter-annotator rule, which requires agreement between two or more users in the crowd in order to retain the annotations provided by users. Use of the inter-annotator agreement rule may become increasingly effective at preventing spam annotations for longer utterances.

Another technique the system may employ to enhance quality is by requiring periodic (e.g., at predefined intervals) Completely Automated Public Turing test to tell Computers and Humans Apart ("CAPTCHA") challenges to be validated. In some instances, the system may use enhanced CAPTCHAs that require certain knowledge of a given subject matter in order to be validated (and start or continue using a resource). In this context, using such enhanced CAPTCHAs, the system may filter users in crowds based on basic knowledge of a given domain they will be tasked to annotate. In this manner, only users with some level of familiarity with a given domain related to a task may be allowed to participate. For instance, when annotating TV shows, only users with certain knowledge of television programming may be allowed to participate, based on their performance on an enhanced CAPTCHA relating to television programming.

In some instances, enhanced or other CAPTCHAS may be used to periodically validate users in a crowd during a given task and/or between tasks to ensure that the user is a human user or verify that the user has some knowledge relating to the domain for which utterances are to be tagged.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention addressing these and other drawbacks relates to a system and method for tagging utterances with NER labels using unmanaged crowds. Tagging entities through unmanaged crowds is described herein for illustration. However, the systems and methods may be used to perform full semantic annotation of natural language utterances through unmanaged crowds using the various operations and programmed devices described herein.

As used herein, the term "tagging" (and similar terms such as "tag") will be used interchangeably with the term "annotating" (and similar terms such as "annotate"). Users among the unmanaged crowd are tasked to perform an annotation job, which entails analyzing utterances (e.g., "watch Jurassic Park on channel 53") associated with a domain (e.g, a "Movies" domain), and annotating entities (e.g., a "Channel" entity and a "Program" entity) associated with the domain.

A domain is a grouping of information that relates to other information within the domain. For instance, a "TV Shows" domain may include subject matter relating to television shows, a "Movies" domain may include subject matter relating to movies, a "Sports" domain may include subject matter relating to sports, and a "Control" domain may include subject matter relating to commands (e.g., "change channel to three hundred"). Other domains may relate to other subject matter as well.

Annotation Job Tasked to Users

Figure 5:
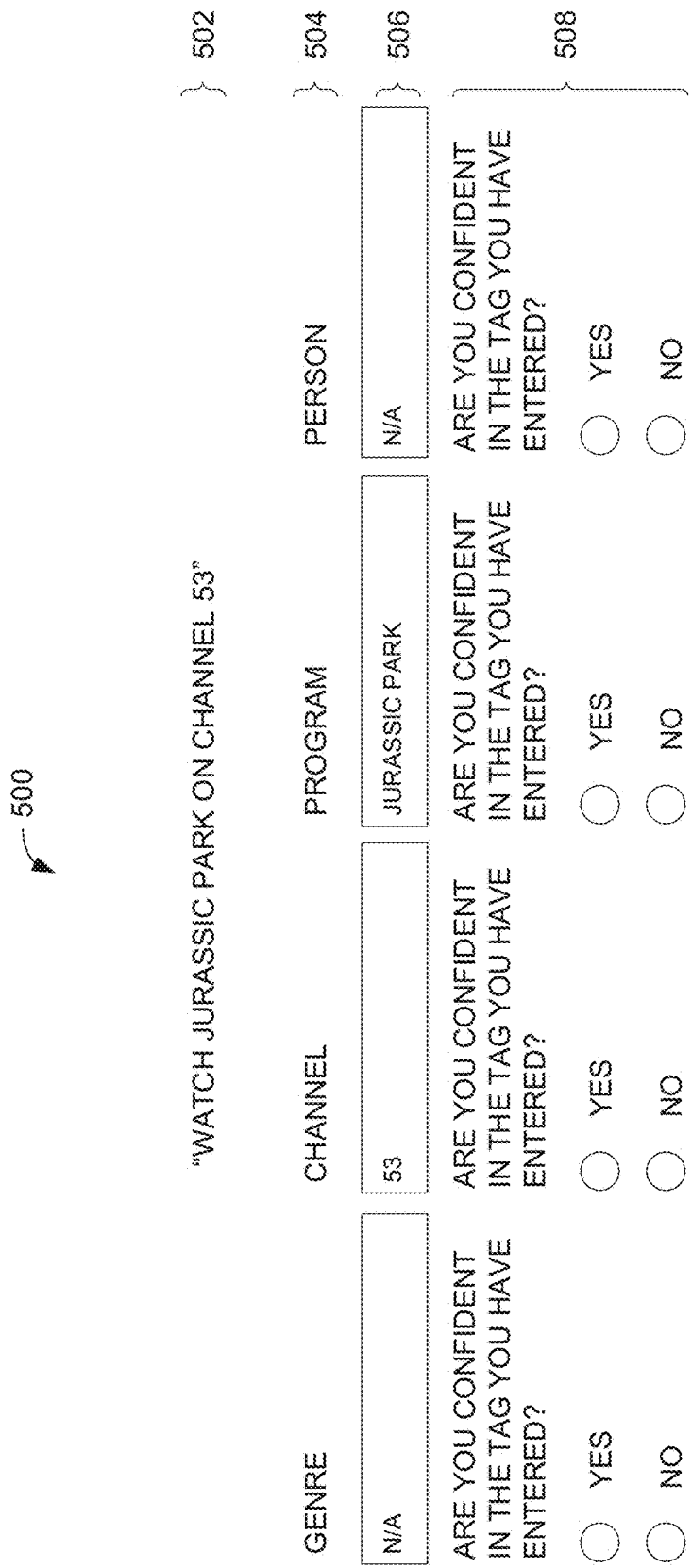
FIG. 5 illustrates a screenshot of a user interface for tagging an utterance with NER labels, according to an implementation of the invention.

Referring to FIG. 5, a user may be asked to tag which parts of an utterance 502, if any, relates to various entities 504 associated with a domain. For example, a user may be tasked to identify which parts of an utterance 502 ("watch Jurassic Park on channel 53"), if any, relates to a "channel" entity and which parts of the utterance, if any, relates to a "program" entity. In the foregoing example, the system may receive from the user an annotation input 506 indicating that "Jurassic Park" relates to the "Program" entity and "53" relates to the "Channel" entity. In instances that the user does not believe any portion of utterance 502 relates to a given entity, the annotation input 506 for that entity may be left blank or populated with a null indicator (e.g., "N/A"). A given annotation job may be part of an annotation batch.

User interface 500 may also include a confidence input member 508, which is configured to receive input from the regarding the user's confidence (or, put another way, uncertainty) in his or her annotation input. This may inform the system that a given user is providing low quality annotations if a number or percentage of their inputs (greater than a threshold number or percentage) are indicated as being not confident. Alternatively or additionally, the user's confidence (or uncertainty) of an annotation input may be used when comparing the user's annotation input with another user's annotation input for the same domain. If the two users disagree on the tagging of a part of the utterance, but both indicated an uncertainty, the system may determine that both responses should be eliminated (not used) for later analysis when building NER models or otherwise.

Multiple users among the crowd may be tasked to perform the same job, thereby collecting a large volume of annotations from different users. Additionally, different permutations of entities may be presented in a different sets of jobs. In this manner, utterances may be annotated with NER labels by unmanaged crowds.

The system may employ various techniques to obtain high quality data by limiting the number of entities a user is asked to tag. For instance, the system may reduce cognitive loads on a user performing an annotation task by limiting the number of entities that the user is asked to analyze. Such limitation may be necessary for domains that are associated with a large number of entities. In this scenario, a user in a crowd may (and typically does) become overwhelmed at the number of entities that must be analyzed in a given job. To mitigate this, the system may limit the number of entities that are presented in a given job, even though a given domain has multiple entities that must be analyzed. To obtain proper data coverage, the system may create multiple jobs to be tasked to unmanaged crowds.

Inter-Annotator Rule

Other techniques described herein reduce instances of spam or otherwise poor quality responses, such as the use of an inter-annotator rule, which requires agreement between two or more users in the crowd. Use of the inter-annotator agreement rule may become increasingly effective at preventing spam annotations for longer utterances. For example, the utterance "find seattle mariners baseball game" when deployed in its first batch for sports annotation, has 1369 unique possible unique annotations. Therefore the probability of chance agreement between the first two annotators is 1 in 1369. The accuracy of annotations increases as the length of the utterance increases and there exists inter-annotation matches.

Table 1 shows the probabilities of chance agreement for different utterance lengths. As the length increases, probability of chance agreement decreases exponentially.

|  | Length (e.g., #words) | | | | | |
| --- | --- | --- | --- | --- | --- | --- |
|  | 1 | 2 | 3 | 4 | 5 | 6 |
| Probability of chance match | 1/5 | 1/25 | 1/109 | 1/413 | 1/1369 | 1/4021 |

Periodic CAPTCHA Challenges

Another technique system 100 may employ to enhance quality is by requiring periodic Completely Automated Public Turing test to tell Computers and Humans Apart ("CAPTCHA") challenges to be validated. In some instances, system 100 may use enhanced CAPTCHAs, which are described more fully by the system disclosed in U.S. patent application Ser. No. 14/846,923, entitled "SYSTEM AND METHOD OF PROVIDING AND VALIDATING ENHANCED CAPTCHAS," filed on Sep. 7, 2015, the contents of which are hereby incorporated herein in its entirety Some of the enhanced CAPTCHAs disclosed in the foregoing use challenges that require certain knowledge of a given subject matter in order to be validated (and start or continue using a resource). In this context, using such enhanced CAPTCHAs, computer system 110 may filter users in crowds based on basic knowledge of a given domain they will be tasked to annotate. In this manner, only users with some level of familiarity with a given domain related to a task may be allowed to participate. For instance, when annotating TV shows, only users with certain knowledge of television programming may be allowed to participate, based on their performance on an enhanced CAPTCHA relating to television programming.

In other instances, enhanced or other CAPTCHAS may be used to periodically validate users in a crowd during a given task and/or in between tasks to ensure that the user is a human user and/or verify that the user has some knowledge relating to the domain for which utterances are to be tagged.

Having described a high level overview of annotation jobs crowds are asked to perform, attention will now be turned to an example of a system architecture that facilitates the foregoing.

Exemplary System Architecture

Figure 1:
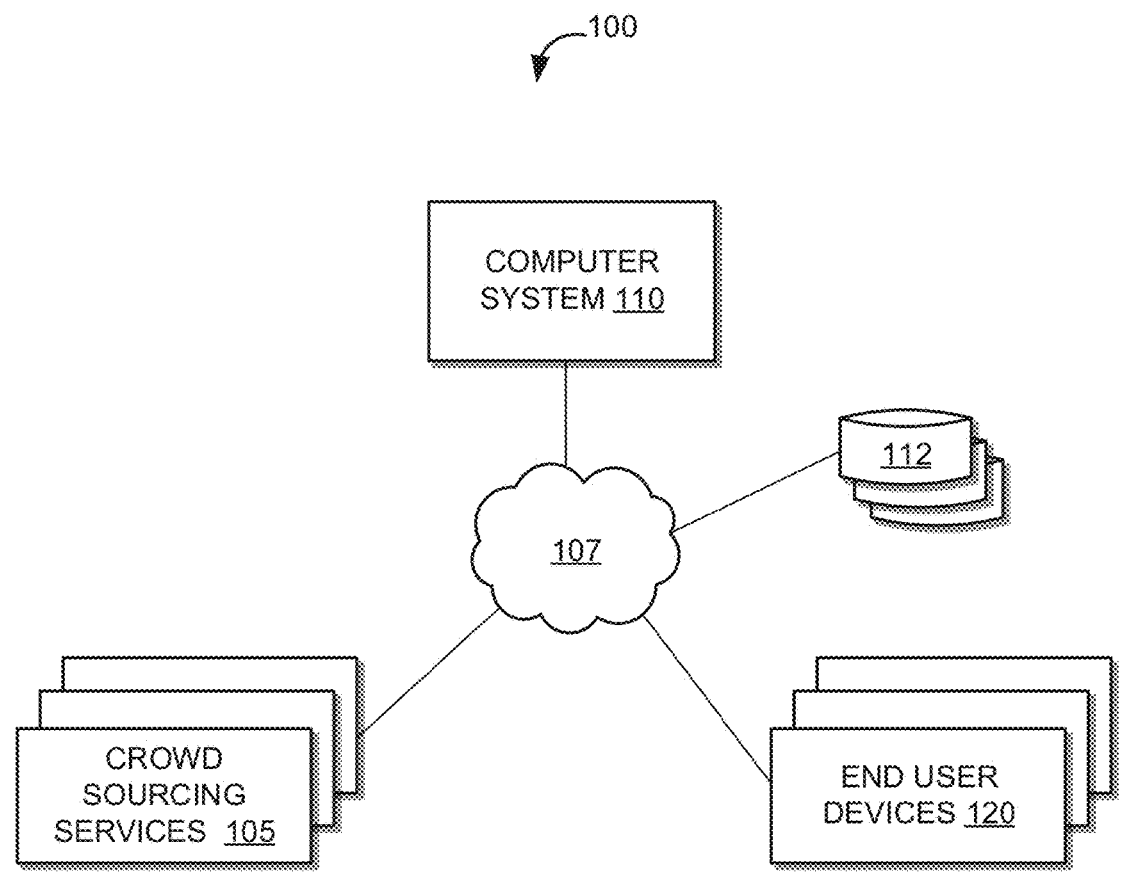
FIG. 1 illustrates a system that facilitates tagging utterances with NER labels using unmanaged crowds, according to an implementation of the invention.

FIG. 1 illustrates a system 100 that facilitates tagging utterances with NER labels using unmanaged crowds, according to an implementation of the invention. In an implementation, system 100 may include a crowd sourcing service 105, a computer system 110, an NER database 112, one or more end user devices, and/or other components. Each component of system 100 may be communicably coupled to one another by one or more computer networks 107.

The system may use crowd sourcing services 105 to distribute annotation jobs to users. Such services may include, for example, Amazon Mechanical Turk™, Crowdflower™, and/or other service that facilitates human intelligence tasks from users who participate in completing predefined tasks, typically, though not necessarily, in exchange for compensation. Annotation jobs may be distributed to users via alternative or additional channels (e.g. directly from computer system 110, online marketing, etc.) as well.

NER database 112 may store utterances that are classified based on domains. Such utterances may be obtained from utterance elicitation systems, actual utterances collected from users (e.g., through their end user devices 120), and/or other source of utterances. A given utterance may be classified under a given domain. For example, a given utterance (or identifying information that identifies the utterance) may be stored in association with a given domain (or identifying information that identifies the domain). In some instances, a given utterance may be classified under two or more domains. For example, the utterance "watch Jurassic park on channel 53" may be classified under a "Movies" domain and/or be classified under a "Control" domain.

A domain may be associated with one or more entities that each describe an aspect of the domain. For example, an entity "Channel" may describe an aspect of a "TV Shows" domain. Such associations may be stored in NER database 112.

Table 2 below illustrates examples of various Domains and their Entities. The entries listed in Table 2 are provided for illustration and not limitation. Other Domains and Entities may be used as well.

| Domain | Batch | Entities |
| --- | --- | --- |
| TV Shows | 1 | CHANNEL, GENRE, PROGRAM, PERSON |
|  | 2 | SEASON, EPISODE, PERIOD |
| Movies/Controls | 1 | CHANNEL, GENRE, PROGRAM, PERSON |
| Sports | 1 | CHANNEL, GENRE, PROGRAM, PERSON |
|  | 2 | TEAM 1, TEAM 2, LEAGUE, SPORTS |

For a given domain that is associated with a number of entities that exceeds a threshold N value (e.g., a maximum value: as illustrated in Table 1, N=4, as the number of Entities in a given batch does not exceed 4), multiple batches, or jobs, may be used to tag a given utterance from that domain. This reduces the cognitive load imposed on a user, and prevents the user from having to tag more than N entities. As such, a domain with a large number of entities may be tagged efficiently by crowd participants without overloading each crowd participant with too many entities to tag.

Figure 2:
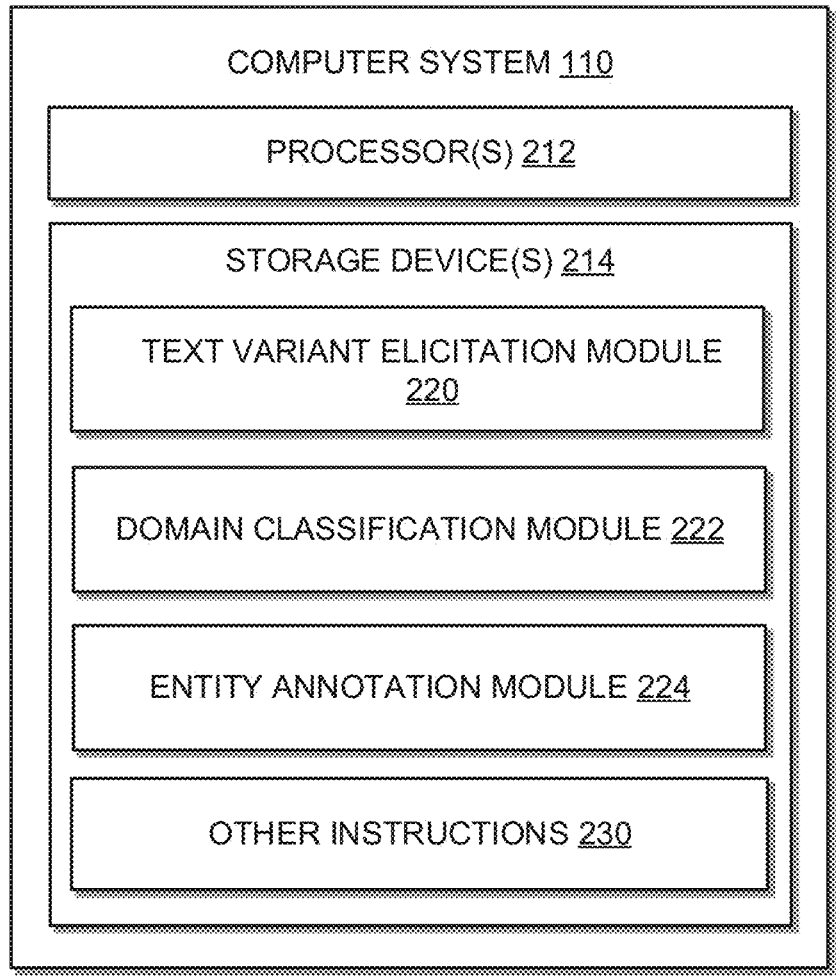
FIG. 2 illustrates a computer system for tagging utterances with NER labels using unmanaged crowds, according to an implementation of the invention.

FIG. 2 illustrates a computer system 110 for tagging utterances with NER labels using unmanaged crowds, according to an implementation of the invention. Computer system 110 may be configured as a server, a desktop computer, a laptop computer, and/or other device that can be programmed to annotate utterances using unmanaged crowds, as described herein.

Computer system 110 may include one or more processors 212 (also interchangeably referred to herein as processors 212, processor(s) 212, or processor 212 for convenience), one or more storage devices 214 (which may store various instructions described herein), and/or other components. Processors 212 may be programmed by one or more computer program instructions. For example, processors 212 may be programmed by a text variant elicitation module 220, a domain classification module 222, an entity annotation module 224, and/or other instructions 230 that program computer system 110 to perform various operations. As used herein, for convenience, the various instructions will be described as performing an operation, when, in fact, the various instructions program the processors 212 (and therefore computer system 110) to perform the operation.

Figure 3:
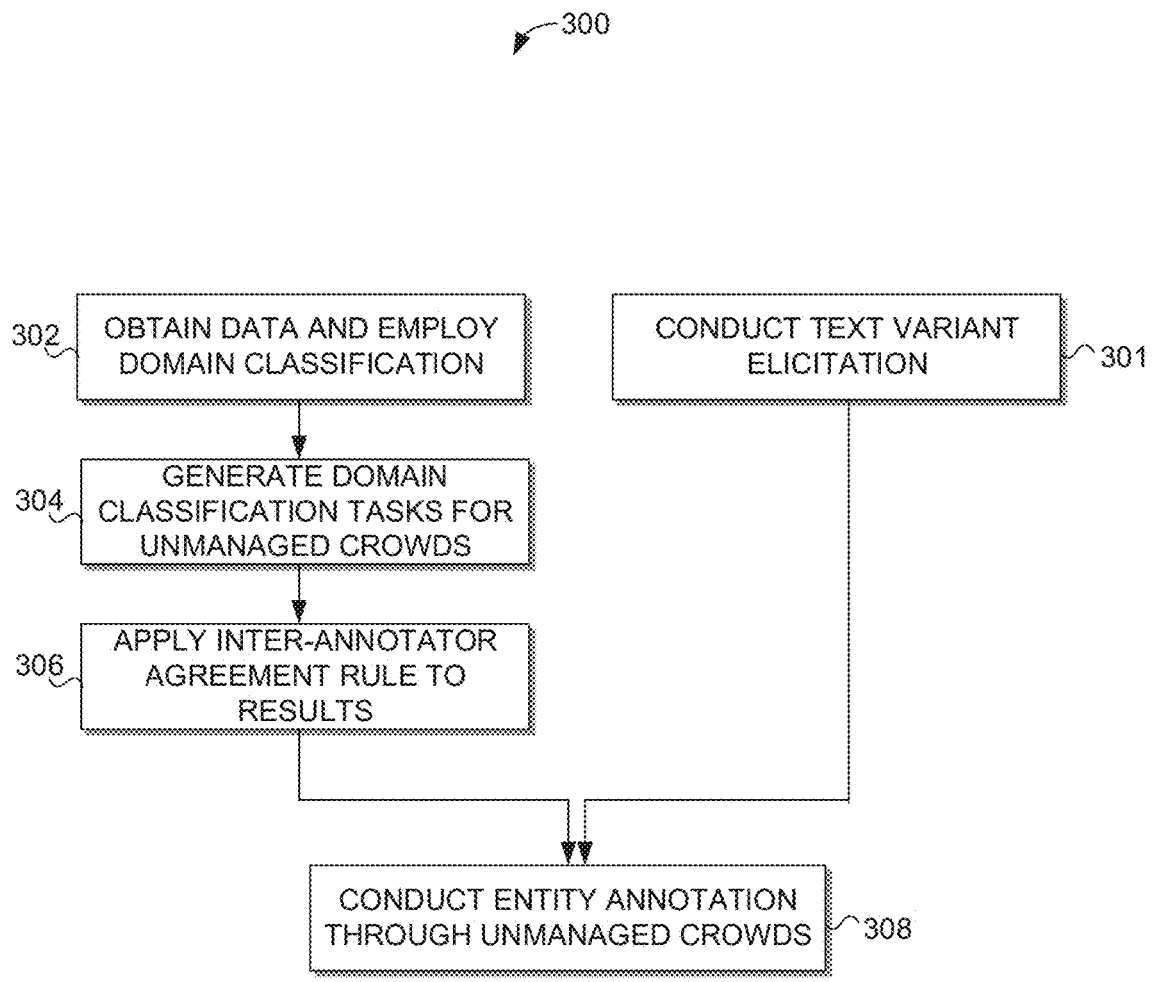
FIG. 3 illustrates a flow diagram of a process of collecting and classifying utterances into domains and tagging the utterances with NER labels using unmanaged crowds, according to an implementation of the invention.

FIG. 3 illustrates a flow diagram of a process 300 of collecting and classifying utterances into domains and tagging the utterances with NER labels using unmanaged crowds, according to an implementation of the invention. Process 300 may be used to classify utterances, either through operation 301, operations 302-306, and/or other classification methods. Once classified, process 300 may include annotating the utterances through unmanaged crowds. Alternatively, utterances may simply be tagged according to all known entities for all domains (i.e., without classifying utterances under a domain prior to annotating the utterances through unmanaged crowds). However, this implementation would be less efficient and require more annotation jobs to be performed by the crowd.

In an operation 301, text variant elicitation module 220 may collect text variants through unmanaged crowds. Text variant elicitation module 220 may define scenarios that need to be represented within a collection. Scenarios are intended to provoke responses from users in the crowd that simulate what a real user would say when using a particular voice recognition product. Some users may say one thing while other users would say another thing.

For example, text variant elicitation module 220 may collect variations of commands that might be used to turn off a device, by tasking users in a crowd: "Imagine you have just finished using our device. Think of two ways you might speak to the device to turn it off." Text variant elicitation is described more fully in U.S. Provisional Patent Application Ser. No. 62/215,115, entitled "SYSTEM AND METHOD FOR ELICITING OPEN-ENDED NATURAL LANGUAGE RESPONSES TO QUESTIONS TO TRAIN NATURAL LANGUAGE PROCESSORS," filed on Sep. 7, 2015, the contents of which are hereby incorporated herein in its entirety.

The foregoing text variants are already classified by text variant elicitation module 220 and therefore require no further classification. For utterances not already classified under a domain in an operation 302, domain classification module 222 may obtain utterances and use unmanaged crowds to identify a likely domain for the utterances.

In an implementation, in an operation 304, domain classification module 222 may generate domain classification tasks in which users in a crowd are presented with individual utterances along with a list of possible domains. Their task is to identify a domain.

Test questions (e.g., those whose answers are known) may be used to ensure quality responses are used. Furthermore, in an operation 306, responses to the jobs deployed in inter-annotator agreement rules may be applied to the aggregated results to ensure quality responses.

Whichever manner is used to classify utterances into domains, once classified, utterances for a given domain may be annotated using unmanaged crowds in an operation 308, as described with reference to FIG. 4, which illustrates a flow diagram 400 of tagging utterances with NER labels using unmanaged crowds, according to an implementation of the invention.

Figure 4:
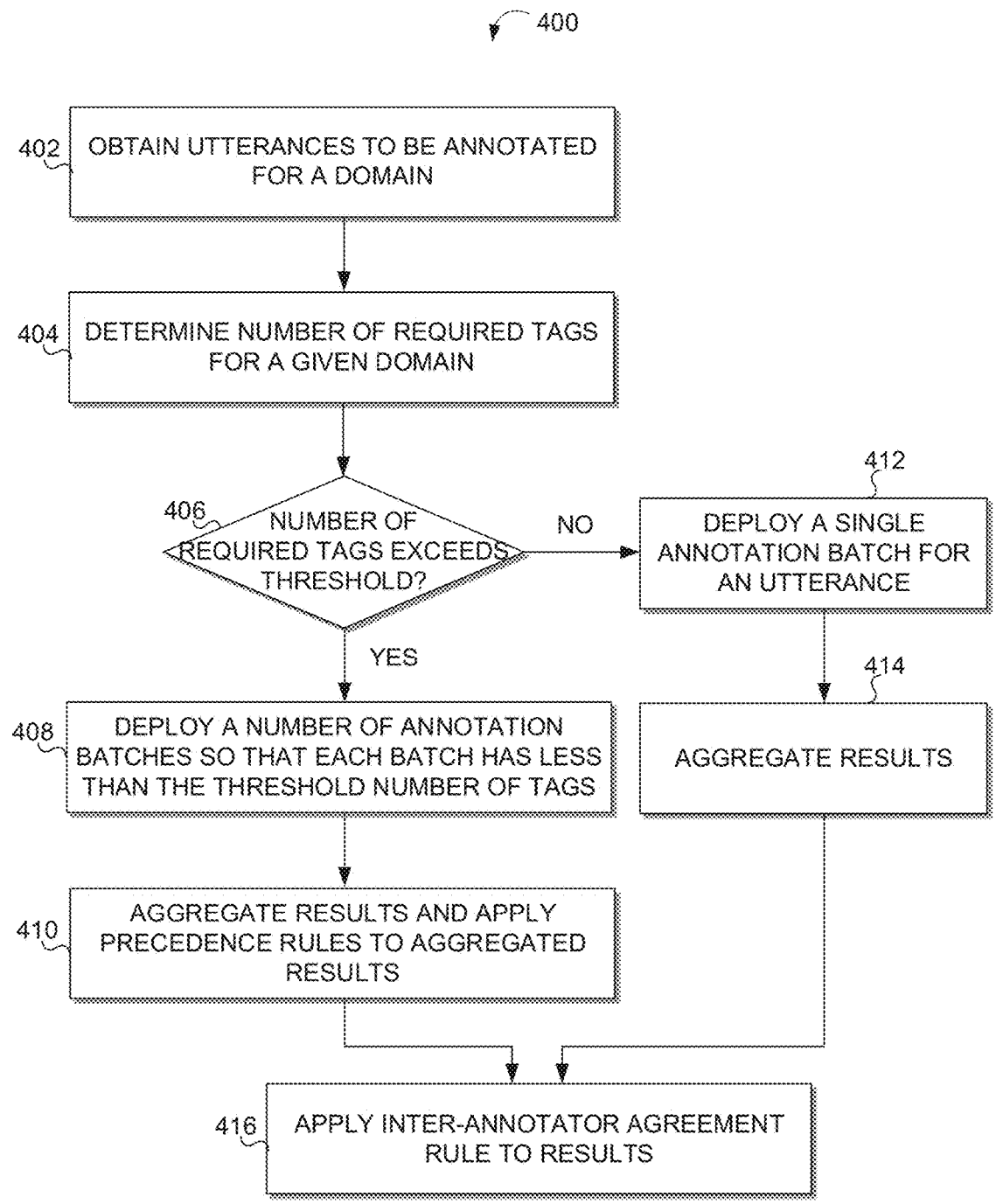
FIG. 4 illustrates a flow diagram of tagging utterances with NER labels using unmanaged crowds, according to an implementation of the invention.

Referring to FIG. 4 (and FIG. 2), in an operation 402, entity annotation module 224 may obtain utterances to be annotated for a given domain.

In an operation 404, entity annotation module 224 may identify a number of entities to be tagged for the domain.

In an operation 406, entity annotation module 224 may determine whether the number of entities exceeds a threshold number. For instance, in order to reduce the cognitive load on a user in a crowd, entity annotation module 224 may limit the number of entities that the user is asked to tag. The threshold number may be preconfigured by an administrator, who specifies the number to reduce cognitive loads, while maintaining efficiency in the number of jobs to be generated.

In an operation 408, responsive to a determination that the number of entities exceeds the threshold number, entity annotation module 224 may, for a given utterance, generate and deploy a number of jobs to be performed so that each job has a number of entities to be tagged less than (or equal to) the threshold number. As such, entity annotation module 224 may employ multiple annotation batches (each having a different set of entities to be tagged) for a single utterance in a domain having a number of entities that exceeds the threshold number. Each of the multiple annotation batches may be tasked to multiple users in the crowd, with each user being provided with the same or different set of entities for tagging the single utterance as another user. For example, if two batches of jobs are generated, one set of users may be tasked with tagging an utterance associated with a first batch having a first set of domains and a second set of users may be tasked with tagging an utterance associated with a second batch having a second set of domains different from the first set of domains.

In an operation 410, entity annotation module 224 may aggregate the results from the crowd (e.g., via crowd sourcing services 105) and apply one or more precedence rules to the results. The precedence rules may specify that certain tags take precedence over others because entities from different batches for the same utterance may overlap. The precedence rules selects certain tags over others whenever such an overlap occurs (so that duplicative tags are mitigated).

Returning to operation 406, responsive to a determination that the number of entities does not exceed the threshold number, in an operation 412, entity annotation module 224 may, for a given utterance, generate a single annotation batch to be performed. Jobs from the single annotation batch may be deployed to multiple users in the crowd, with each user being asked to tag the same utterance based on the same set of entities as another user. In an operation 414, entity annotation module 224 may aggregate the results received back from the crowd (e.g., via crowd sourcing services 105).

In an operation 416, entity annotation module 224 may apply aforementioned inter-annotator rules to the responses received back from the crowd.

As used herein, annotation jobs are "deployed" or otherwise provided to users via a crowd sourcing service 105 by causing information that specifies the annotation job to be transmitted to the crowd sourcing service, such as via a network 107. Likewise, responses (also referred to herein as "annotations") to annotation jobs may be received from crowd sourcing service 105 in the form of information transmitted over the network which conveys the responses.

The analyzed set of responses may be used to build NER models for natural language understanding. Alternatively or additionally, the analyzed set of responses may be used in real-time as a user (not a crowd user) enters an utterance. For example, a user may speak a command into a remote control device. The remote control device may upload the utterance (or words or phrases recognized using ASR) to computer system 110, which generates annotation batch(es) described herein. Assuming the crowd size is active and sufficiently large, real-time processing of the command may be performed to help inform the meaning of the utterance.

The one or more processors 212 illustrated in FIG. 2 may each include one or more physical processors that are programmed by computer program instructions. The various instructions described herein are exemplary only. Other configurations and numbers of instructions may be used, so long as the processor(s) 212 are programmed to perform the functions described herein.

Furthermore, it should be appreciated that although the various instructions are illustrated in FIG. 2 as being co-located within a single processing unit, in implementations in which processor(s) 212 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 212 may be programmed by one or more additional instructions that may perform some or all of the functionality attributed herein to one of the instructions.

The various instructions described herein may be stored in a storage device 214, which may comprise random access memory (RAM), read only memory (ROM), and/or other memory. The storage device may store the computer program instructions (e.g., the aforementioned instructions) to be executed by processor 212 as well as data that may be manipulated by processor 212. The storage device may comprise floppy disks, hard disks, optical disks, tapes, or other storage media for storing computer-executable instructions and/or data.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 107, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of tagging utterances with Named Entity Recognition ("NER") labels using an unmanaged crowd, the method being implemented in an end user device having one or more physical processors programmed with computer program instructions that, when executed by the one or more physical processors, cause the end user device to perform the method, the method comprising:

obtaining, by the computer system, a plurality of utterances relating to a domain, the domain being associated with a plurality of entities, each entity relating to a category of information in the domain;

generating, by the computer system, a first annotation job configured to request that at least a first portion of the utterance be assigned to one of a first set of entities, from among the plurality of entities, wherein a number of the first set of entities does not exceed a maximum number such that cognitive load imposed on a user to whom the first annotation job is provided is controlled;

generating, by the computer system, a second annotation job configured to request that at least a second portion of the utterance be assigned to one of a second set of entities, from among the plurality of entities, wherein: a number of the second set of entities does not exceed the maximum number such that cognitive load imposed on a user to whom the second annotation job is provided is controlled, the first portion and the second portion are the same or different and the first set of entities is different than the second set of entities, and the user to whom the first annotation job is provided is the same or different from the user to whom the second annotation job is provided;

causing, by the computer system, the first annotation job and the second annotation job to be deployed to the unmanaged crowd; and receiving, by the computer system, a plurality of annotations provided by the unmanaged crowd, the plurality of annotations comprising a first annotation relating to the first annotation job and a second annotation relating to the second annotation job.

2. The method of claim 1, the method further comprising:
determining, by the computer system, whether to retain at least some of the plurality of annotations from consideration to build a NER model.

3. The method of claim 2, wherein determining whether to retain at least some of the plurality of annotations comprises:
applying, by the computer system, an inter-annotator agreement rule, which requires agreement between two or more users in the crowd in order to retain the annotations provided by the two or more users, to the plurality of annotations.

4. The method of claim 2, wherein determining whether to retain at least some of the plurality of annotations comprises:
receiving, by the computer system, a first indication of uncertainty in an annotation of a portion of the utterance from a first user;
receiving, by the computer system, a second indication of uncertainty in an annotation of the portion of the utterance from a second user;
determining, by the computer system, that the annotation of the portion of the utterance from the first user and the annotation of the portion of the utterance from the second user are inconsistent with one another; and
not retaining, by the computer system, the annotation of the portion of the utterance from the first user nor the annotation of the portion of the utterance from the second user responsive to the determination, the first indication, and the second indication.

5. The method of claim 2, wherein determining whether to retain at least some of the plurality of annotations comprises:
determining, by the computer system, a number of indications of uncertainty of annotations indicated by a first user;
determining, by the computer system, whether the number of indication of uncertainty exceeds a predefined threshold; and
responsive to a determination that the number of indication of uncertainty exceeds the predefined threshold, omitting, by the computer system, annotations from the first user.

6. The method of claim 1, wherein at least one of the first set of entities overlaps with the second set of entities, the method further comprising:
applying, by the computer system, a precedence rule to resolve the overlap.

7. The method of claim 1, the method further comprising;
causing, by the computer system, a validator to distinguish between humans and computers to be required before, during, or after an annotation job.

8. The method of claim 7, the method further comprising;
causing, by the computer system, the validator to be presented to users at predefined intervals, including after an initial validator has been presented to the user.

9. The method of claim 1, the method further comprising:
generating, by the computer system, a plurality of domain classification jobs configured to request that an utterance be classified according to a domain;
causing, by the computer system, the plurality of domain classification jobs to be provided to the unmanaged crowd; and
receiving, by the computer system, results of the plurality of domain classification jobs, wherein the plurality of utterances are determined to be related to the domain based on the results of the plurality of domain classification jobs.

10. The method of claim 1, wherein the first annotation job is part of a first batch of annotation jobs and the second annotation job is part of a second batch of annotation jobs, the method further comprising:
determining, by the computer system, a number of the plurality of entities associated with the domain; and
determining, by the computer system, a number of batches of annotation jobs, including the first batch and the second batch, required based on the maximum number.

11. A system of tagging utterances with Named Entity Recognition ("NER") labels using unmanaged crowds, the comprising:
an end user device having one or more physical processors programmed with computer program instructions that, when executed by the one or more physical processors, cause the end user device to:
obtain a plurality of utterances relating to a domain, the domain being associated with a plurality of entities, each entity relating to a category of information in the domain;
generate a first annotation job configured to request that at least a first portion of the utterance be assigned to one of a first set of entities, from among the plurality of entities, wherein a number of the first set of entities does not exceed a maximum number such that cognitive load imposed on a user to whom the first annotation job is provided is controlled;
generate a second annotation job configured to request that at least a second portion of the utterance be assigned to one of a second set of entities, from among the plurality of entities, wherein: a number of the second set of entities does not exceed the maximum number such that cognitive load imposed on a user to whom the second annotation job is provided is controlled, the first portion and the second portion are the same or different and the first set of entities is different than the second set of entities, and the user to whom the first annotation job is provided is the same or different from the user to whom the second annotation job is provided;
cause the first annotation job and the second annotation job to be deployed to the unmanaged crowd; and
receive a plurality of annotations provided by the unmanaged crowd, the plurality of annotations comprising a first annotation relating to the first annotation job and a second annotation relating to the second annotation job.

12. The system of claim 11, wherein the computer system is further programmed to:
determine whether to retain at least some of the plurality of annotations from consideration to build a NER model.

13. The system of claim 12, wherein to determine whether to retain at least some of the plurality of annotations, the computer system is further programmed to:
apply an inter-annotator agreement rule, which requires agreement between two or more users in the crowd in order to retain the annotations provided by the two or more users, to the plurality of annotations.

14. The system of claim 12, wherein to determine whether to retain at least some of the plurality of annotations, the computer system is further programmed to:
receive a first indication of uncertainty in an annotation of a portion of the utterance from a first user;
receive a second indication of uncertainty in an annotation of the portion of the utterance from a second user;
determine that the annotation of the portion of the utterance from the first user and the annotation of the portion of the utterance from the second user are inconsistent with one another; and
not retain the annotation of the portion of the utterance from the first user nor the annotation of the portion of the utterance from the second user responsive to the determination, the first indication, and the second indication.

15. The system of claim 12, wherein to determine whether to retain at least some of the plurality of annotations, the computer system is further programmed to:
determine a number of indications of uncertainty of annotations indicated by a first user;
determine whether the number of indication of uncertainty exceeds a predefined threshold; and
responsive to a determination that the number of indication of uncertainty exceeds the predefined threshold, omit annotations from the first user.

16. The system of claim 11, wherein at least one of the first set of entities overlaps with the second set of entities, wherein the computer system is further programmed to:
apply a precedence rule to resolve the overlap.

17. The system of claim 11, wherein the computer system is further programmed to:
cause a validator to distinguish between humans and computers to be required before, during, or after an annotation job.

18. The system of claim 17, wherein the computer system is further programmed to:
cause the validator to be presented to users at predefined intervals, including after an initial validator has been presented to the user.

19. The system of claim 11, wherein the computer system is further programmed to:
generate a plurality of domain classification jobs configured to request that an utterance be classified according to a domain;
cause the plurality of domain classification jobs to be provided to the unmanaged crowd; and
receive results of the plurality of domain classification jobs, wherein the plurality of utterances are determined to be related to the domain based on the results of the plurality of domain classification jobs.

20. The system of claim 11, wherein the first annotation job is part of a first batch of annotation jobs and the second annotation job is part of a second batch of annotation jobs, wherein the computer system is further programmed to:
determine a number of the plurality of entities associated with the domain; and
determine a number of batches of annotation jobs, including the first batch and the second batch, required based on the maximum number.

* * * * *